(12) United States Patent
Stroemberg et al.

(10) Patent No.: US 12,249,801 B2
(45) Date of Patent: Mar. 11, 2025

(54) CRYSTAL ROD ALIGNMENT BODY FOR HEATSINKS

(71) Applicant: Lumentum Operations LLC, San Jose, CA (US)

(72) Inventors: Christoffer Stroemberg, Schlieren (CH); Connor Benton, Schlieren (CH); Alba Fornells Vernet, Schlieren (CH)

(73) Assignee: Lumentum Operations LLC, San Jose, CA (US)

( * ) Notice: Subject to any disclaimer, the term of this patent is extended or adjusted under 35 U.S.C. 154(b) by 591 days.

(21) Appl. No.: 17/646,395

(22) Filed: Dec. 29, 2021

(65) Prior Publication Data

US 2023/0129060 A1 Apr. 27, 2023

Related U.S. Application Data

(60) Provisional application No. 63/263,071, filed on Oct. 26, 2021.

(51) Int. Cl.
| | | |
|---|---|---|
| *H01S 3/04* | (2006.01) | |
| *H01S 3/00* | (2006.01) | |
| *H01S 3/02* | (2006.01) | |
| *H01S 3/042* | (2006.01) | |
| *H01S 3/06* | (2006.01) | |
| *H01S 3/16* | (2006.01) | |

(52) U.S. Cl.
CPC .......... *H01S 3/0405* (2013.01); *H01S 3/0014* (2013.01); *H01S 3/025* (2013.01); *H01S 3/042* (2013.01); *H01S 3/061* (2013.01); *H01S 3/0407* (2013.01); *H01S 3/1643* (2013.01)

(58) Field of Classification Search
CPC ...... H01S 3/0405; H01S 3/0014; H01S 3/025; H01S 3/042; H01S 3/061; H01S 3/0407; H01S 3/1643
See application file for complete search history.

(56) References Cited

U.S. PATENT DOCUMENTS

| | | | | |
|---|---|---|---|---|
| 5,761,233 A | * | 6/1998 | Bruesselbach | ........ H01S 3/0941 372/66 |
| 2002/0018288 A1 | * | 2/2002 | Rieger | .................. H01S 3/0606 359/342 |
| 2023/0120272 A1 | * | 4/2023 | Stroemberg | .......... H01S 3/1618 372/35 |

* cited by examiner

*Primary Examiner* — Kinam Park
(74) *Attorney, Agent, or Firm* — Harrity & Harrity, LLP

(57) ABSTRACT

A heat sink assembly may include an alignment body with an opening configured to receive a crystal rod, wherein the opening is configured to maintain a crystalline orientation of the crystal rod relative to a physical orientation of the alignment body. The heat sink assembly may include a first cooling stack, wherein the first cooling stack includes a first cutout to receive the crystal rod and the alignment body. The heat sink assembly may include a second cooling stack, wherein the second cooling stack includes a second cutout to receive the crystal rod and the alignment body, and wherein the first cooling stack and the second cooling stack are configured to mate and at least partially sandwich the crystal rod and the alignment body.

20 Claims, 9 Drawing Sheets

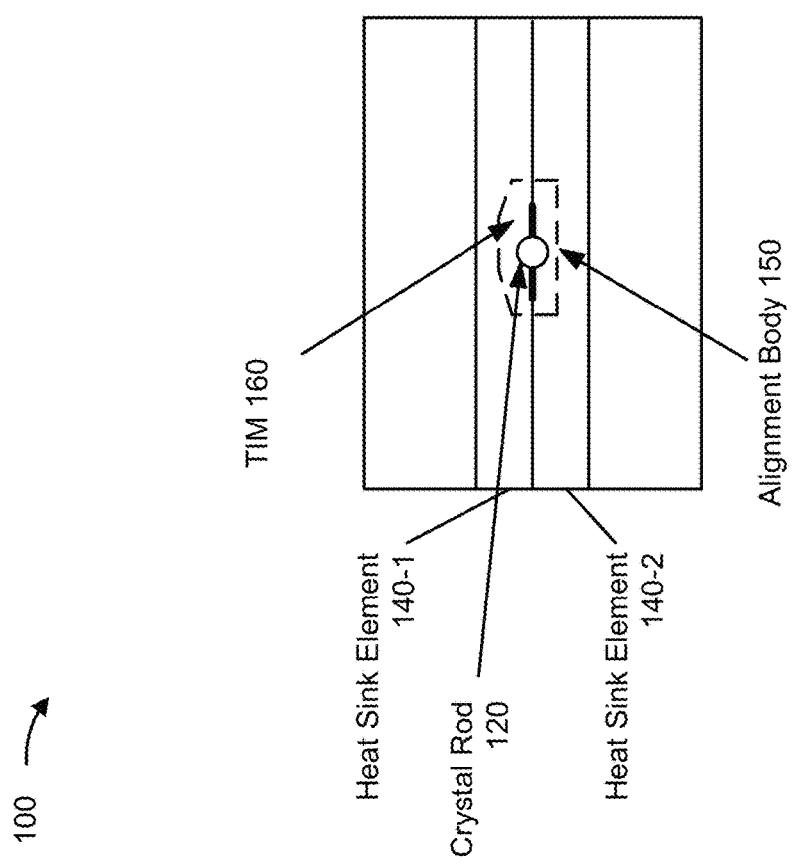

CRYSTAL ROD ALIGNMENT BODY FOR HEATSINKS

CROSS-REFERENCE TO RELATED APPLICATION

This Patent Application claims priority to U.S. Provisional Patent Application No. 63/263,071, filed on Oct. 26, 2021, and entitled "ROD ALIGNMENT FOR OPTICAL DEVICES." The disclosure of the prior Application is considered part of and is incorporated by reference into this Patent Application.

TECHNICAL FIELD

The present disclosure relates generally to a heat sink assembly and to a heat sink assembly that includes an alignment body for aligning a crystalline orientation of a crystal rod with a physical orientation of the heat sink assembly.

BACKGROUND

An optical device may include a crystal rod as a solid state lasing medium. The optical device may pump the crystal rod with very high energy to cause stimulated emission out of an end of the crystal rod. During optical pumping, a temperature of the crystal rod can increase, which may result in damage to the optical device or poor performance (e.g., an unintended alteration to an output of the optical device), among other examples. To achieve thermal management for the crystal rod, an optical device may include a heat sink assembly that surrounds the crystal rod and controls a temperature of the crystal rod. One example of a heat sink assembly is a copper heat sink assembly with water cooling. In this example, a copper heat sink element enables transfer of heat from the crystal rod to a cooling block. The cooling block interfaces with a water-based coolant that transfers heat away from the cooling block. In some cases, the cooling block and the heat sink may be a single, integrated component.

SUMMARY

In some implementations, a heat sink assembly includes an alignment body with an opening configured to receive a crystal rod, wherein the opening is configured to maintain a crystalline orientation of the crystal rod relative to a physical orientation of the alignment body; a first cooling stack, wherein the first cooling stack includes a first cutout to receive the crystal rod and the alignment body; and a second cooling stack, wherein the second cooling stack includes a second cutout to receive the crystal rod and the alignment body, and wherein the first cooling stack and the second cooling stack are configured to mate and at least partially sandwich the crystal rod and the alignment body.

In some implementations, a heat sink assembly includes a first cooling stack including a first heat sink element; a second cooling stack including a second heat sink element; an optical component; and an alignment body mated to the optical component, wherein the first heat sink element and the second heat sink element include respective cutouts to receive the alignment body and the optical component.

In some implementations, a method includes imaging a crystal rod to determine a crystalline orientation of the crystal rod; attaching an alignment body to the crystal rod, wherein a physical orientation of the alignment body is fixed relative to the crystalline orientation of the crystal rod; and attaching a first cooling stack to a second cooling stack, such that the crystal rod and the alignment body are sandwiched between the first cooling stack and the second cooling stack and the crystalline orientation of the crystal rod is fixed in alignment with the first cooling stack and the second cooling stack.

BRIEF DESCRIPTION OF THE DRAWINGS

FIGS. 1A-1D are diagrams of an example heat sink assembly described herein.

DETAILED DESCRIPTION

Figure 1A:
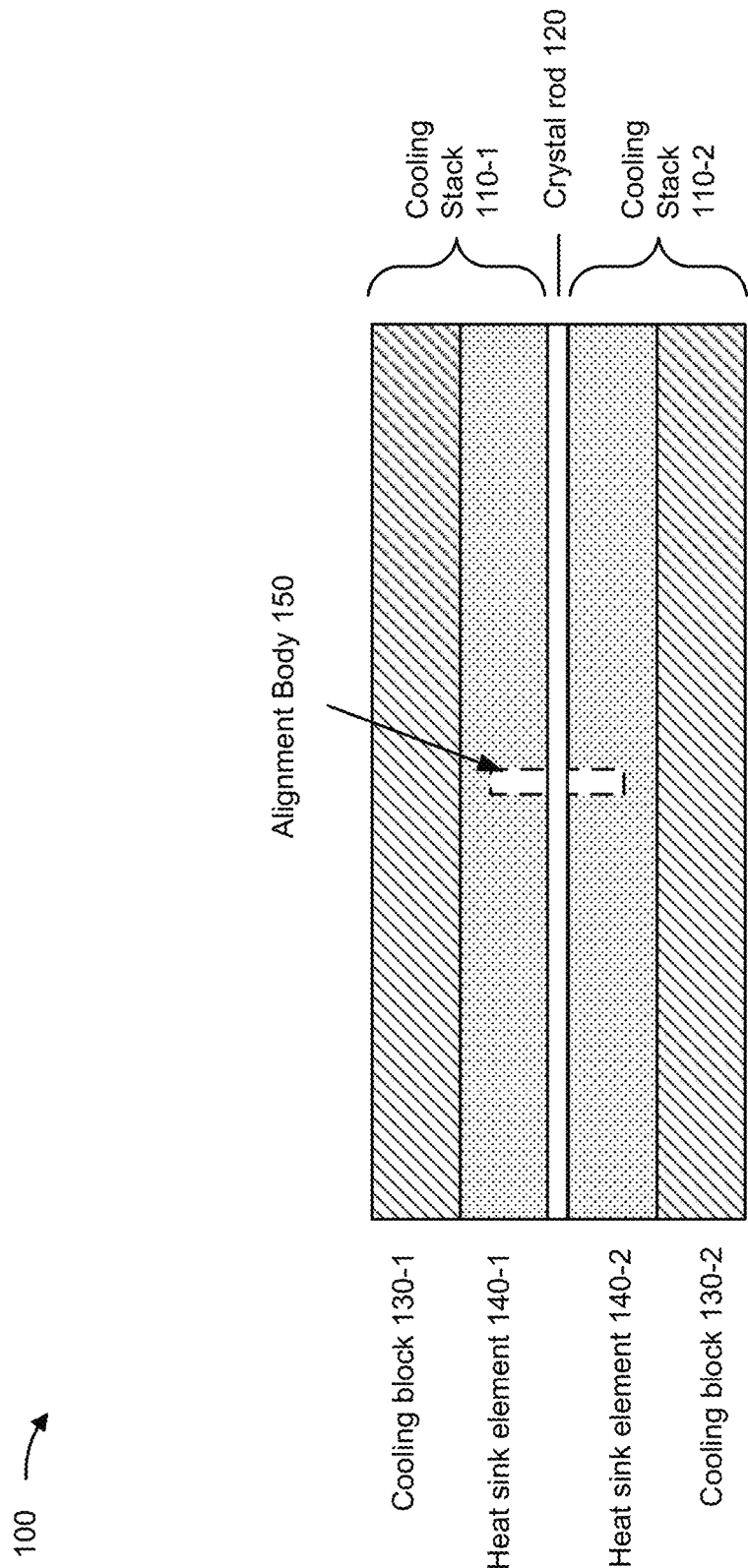

The following detailed description of example implementations refers to the accompanying drawings. The same reference numbers in different drawings may identify the same or similar elements.

Optical devices, such as lasers, may include heat sink assemblies for thermal management. A heat sink assembly may include a thermally conductive heat sink element and a cooling block. The conductive heat sink element may conduct heat away from a crystal rod of the optical device and toward the cooling block (and/or towards a medium for removing the heat, such as fluid or gaseous medium). The cooling block, which may be integrated with the heat sink element into a single component, may interface with a coolant (or the surrounding atmosphere) to remove heat from the optical device. Removing heat from the optical device reduces a likelihood of damage to the optical device and/or poor performance. To assemble a heat sink assembly, a crystal rod (e.g., a cylindrical optical component providing a laser medium for the optical device) is disposed between cooling blocks of the heat sink assembly. For example, the heat sink assembly may include a first cooling block with a first cylindrical cutout and a second cooling block with a second cylindrical cutout, and the crystal rod may be disposed within the respective cylindrical cutouts when the first cooling block is attached to the second cooling block. The cooling blocks prevent the crystal rod from rotating within the cylindrical cutouts.

However, if the crystalline orientation of the crystal rod is poorly aligned to an optical system that includes the crystal rod, the optical system may experience depolarization losses, which may result in poor performance. The heat sink assembly may be mounted in the optical system to prevent a physical alignment of the heat sink assembly from changing, thereby reducing a likelihood that the crystal rod becomes poorly aligned during operation. However, if the crystal rod is attached to the heat sink assembly with an improper rotational orientation of the crystal rod, mounting the heat sink assembly to the optical system may set the crystal rod at an improper alignment with the optical system, resulting in poor performance.

The correct rotational alignment of the crystal rod to an optical system (e.g., to prevent depolarization losses) may be based on a crystalline structure of the crystal rod. Accordingly, the rotational alignment of the crystal rod may be referred to as the "crystalline orientation" of the crystal rod or the orientation of the crystalline structure of the crystal rod to a rotational orientation of an optical system. When a visual analysis is performed, the crystal rod may appear uniform, which may make determining the crystalline orientation difficult. Markings may be added to the crystal rod to indicate a rotational orientation of the crystal rod to achieve alignment to an optical system; however, positioning and attachment of the crystal rod may result in alterations to the rotational orientation sufficient to result in excess depolarization losses. Accordingly, adding markings may be insufficient to achieve a level of alignment accuracy that results in elimination or sufficient reduction of depolarization losses for optical systems.

Some implementations described herein may provide an alignment body for aligning a crystalline orientation of a crystal rod with a physical orientation of a heat sink assembly. For example, the crystal rod may be disposed in an opening of an alignment body and the alignment body (with the crystal rod) may be sandwiched between respective cooling blocks of a heat sink assembly. In this case, the alignment body may enable the crystalline orientation of the crystal rod to be aligned to within a threshold tolerance of a physical orientation of the heat sink assembly. In this way, the crystalline orientation of the crystal rod is statically fixed for an optical system, thereby achieving a reduction or elimination of depolarization losses resulting from poor alignment.

FIGS. 1A-1D are diagrams of an example heat sink assembly 100.

As shown in FIG. 1A, in a cross-sectional side-view, heat sink assembly 100 may include a first cooling stack 110-1 and a second cooling stack 110-2 sandwiching a crystal rod 120. Each cooling stack 110 may include a respective cooling block 130 and heat sink element 140. For example, first cooling stack 110-1 includes cooling block 130-1 and heat sink element 140-1, and second cooling stack 110-2 includes cooling block 130-2 and heat sink element 140-2. The crystal rod 120 may be disposed in an alignment body 150, which is sandwiched by first cooling stack 110-1 and second cooling stack 110-2. In some implementations, cooling stacks 110 may be integrated into a heat exchanger system or may interface with a heat exchanger (e.g., a thermoelectric cooler or a set of heat tubes to remove heat from the crystal rod 120).

Figure 1C:
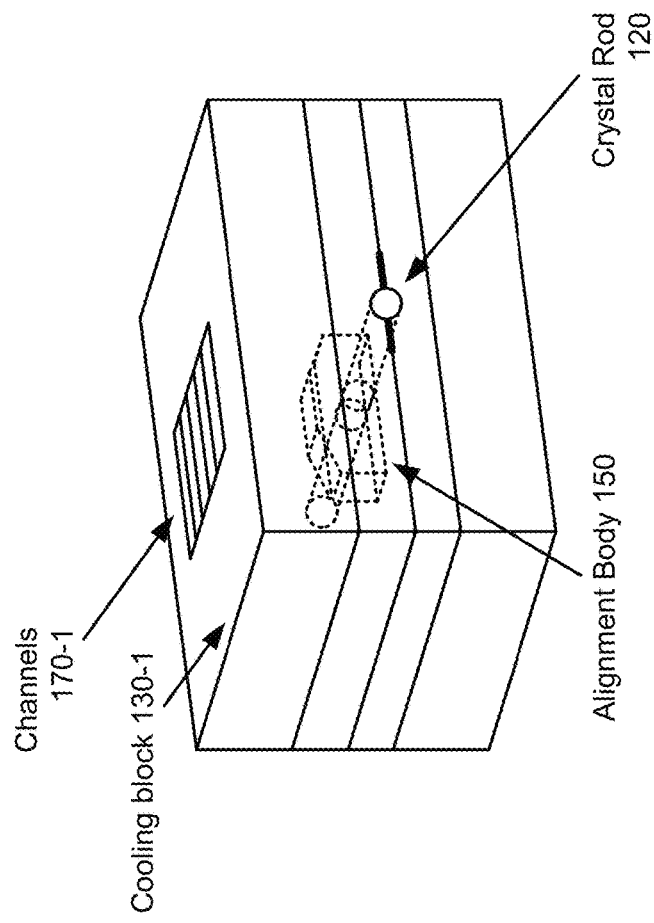
Figure 1D:
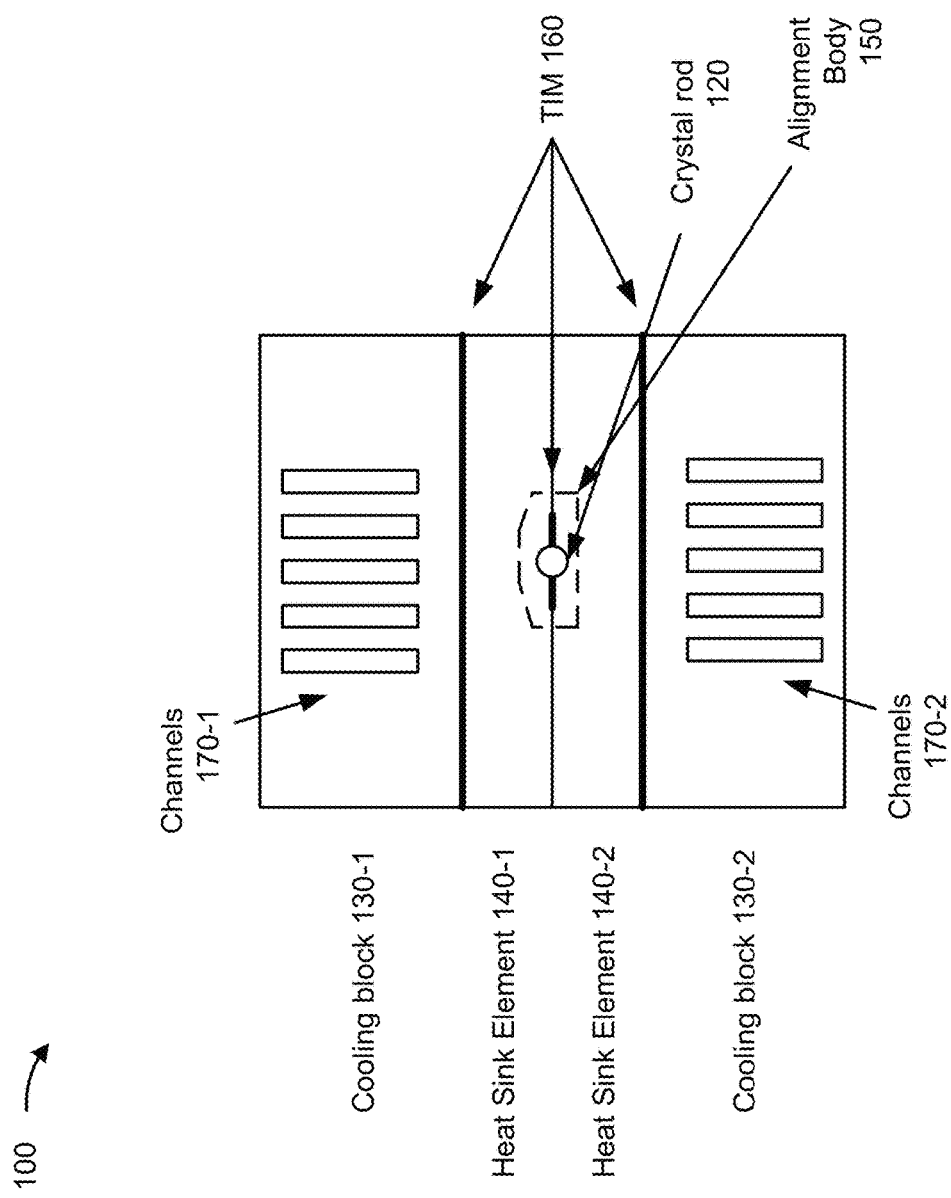

As shown in FIG. 1B, in a front-view, heat sink assembly 100 may include a thermal interface material (TIM) 160. For example, thermal interface material 160 may be disposed between respective surfaces of heat sink element 140-1 and second heat sink element 140-2 and/or between surfaces of heat sink elements 140 and crystal rod 120 and/or alignment body 150. As shown in FIGS. 1C and 1D, in a projection view and a cross-sectional front-view, respectively, heat sink assembly 100 may include a set of channels 170 in each cooling block 130. For example, cooling block 130-1 may include a first set of channels 170-1 and cooling block 130-2 may include a second set of channels 170-2.

In some implementations, as shown in FIG. 1D, thermal interface material 160 may also be present at interfaces between cooling blocks 130 and heat sink elements 140. For example, thermal interface material 160 may be disposed between cooling block 130-1 and heat sink element 140-1 and between heat sink element 140-2 and cooling block 130-2. Thermal interface material 160 may include an indium based material, a solder material, or another type of material for transferring heat between crystal rod 120 and heat sink elements 140 (and/or between heat sink elements 140 and cooling blocks 130, between crystal rod 120 and alignment body 150, and/or between alignment body 150 and heat sink elements 140), such as a phase change material, a gap filler, a thermal grease, a thermally conductive hardware material, an adhesive film, a thermal rubber pad, an adhesive tape, a paste, a putty, a gel, a potting compound, a liquid adhesive, a carbon-based material (e.g., a graphite material, such as pyrolytic graphite), or a tin material, among other examples. Using a thermal interface material 160 may reduce a gap between a first face of a first body and a second face of a second body (e.g., a surface of crystal rod 120 and a first face of heat sink element 140 or a second face of heat sink element 140 and a surface of cooling block 130) from, for example, a millimeter gap to a micron gap (or smaller, such as a zero gap), thereby improving an efficiency of thermal transfer between bodies.

In some implementations, crystal rod 120 may be a particular type of crystal rod. For example, crystal rod 120 may be an ytterbium-doped, yttrium-aluminum-garnet (Yb:YAG) laser medium that produces a beam when energy is applied to crystal rod 120. In some implementations, crystal rod 120 may have a different type of crystal material and/or doping. As an example, crystal rod 120 may have a length of 40 millimeters (mm) and a diameter of 1 mm. It should be understood that other dimensions are contemplated for crystal rod 120. Additionally, or alternatively, crystal rod 120 may be another type of optical component that may be cooled by heat sink assembly 100. For example, heat sink assembly 100 may include and/or may attach to another type of crystal rod, another type of laser medium, or another type of emitter, among other examples.

In some implementations, alignment body 150 may be a material configured to match a coefficient of thermal expansion (CTE) of crystal rod 120. For example, alignment body 150 may be an ytterbium material (e.g., undoped ytterbium) to match a thermal expansion of crystal rod 120. Additionally, or alternatively, alignment body 150 may be a copper alloy material or another metal alloy material (e.g., a steel alloy or aluminum alloy), a glass material, a crystal material, among other examples. In some implementations, alignment body 150 may have a first CTE within 25%, within 15%, within 10%, or smaller of a second CTE of crystal rod 120. Similarly, alignment body 150 may have a first CTE within 25%, within 15%, within 10%, or smaller of a third CTE of heat sink elements 140. By ensuring a CTE match of within 25%, 15%, 10%, or smaller to crystal rod 120 and/or heat sink elements 140, alignment body 150 reduces a likelihood of damage from differential expansion of alignment body 150 relative to heat sink elements 140 or crystal rod 120. In some implementations, alignment body 150 may be a insulative with less than a threshold thermal conductivity to avoid gaining heat from crystal rod 120, thereby improving performance relative to an alignment body that is a thermally conductive material.

In some implementations, a cooling block 130 and a set of channels 170 may be configured to receive a coolant. For example, channels 170 may be coolant channels that include an opening for receiving a liquid coolant. The liquid coolant may include water coolant, a water-based coolant, or another type of liquid coolant. In some implementations, heat sink assembly 100 may form and/or include a type of liquid cooling system, such as a recirculating chiller, a liquid-to-liquid cooling system, an ambient cooling system, a cold plate cooling system, or a heat exchanger cooling system, among other examples.

In some implementations, heat sink elements 140 may include a particular type of material. For example, heat sink elements 140 may be an alloy material. For example, heat sink elements 140 may include copper alloy. Additionally, or alternatively, heat sink elements 140 may be another type of metal-diamond composite material. For example, heat sink elements 140 may include a silver-diamond composite material, an aluminum-diamond composite material, a copper-diamond composite material, or a magnesium-diamond composite material, among other examples. In some implementations, heat sink elements 140 may use a material (e.g., silver-diamond composite) that has a CTE in a range from 3 to 8, in a range from 5 to 8, or of 7.5. Moreover, the CTE of heat sink element 140 may match a CTE of crystal rod 120 to within 50%, within 25%, or within 10%, thereby reducing a likelihood of thermal stressing and associated thermal damage from differential thermal expansion. In this way, by using a metal-diamond composite material, such as silver-diamond composite, among other examples, heat sink elements 140 may achieve a thermal conductivity that is approximately two times higher than that of a monolithic copper heat sink. Improving the thermal conductivity results in more efficient heat spreading from the crystal rod 120 and heating of coolant in cooling block 130 at a lower temperature differential between the coolant and crystal rod 120, thereby enabling more efficient cooling of the crystal rod 120 by heat sink assembly 100.

In some implementations, heat sink elements 140 may have a gold-coated surface. For example, heat sink elements 140 may be a gold-coated, copper alloy material or metal-diamond composite material, among other examples. Additionally, or alternatively, heat sink elements 140 may have another type of surface-plating or coating, such as nickel surface-plating or coating. By adding surface plating of a relatively inert, smooth, and/or durable material (e.g., gold or nickel, among other examples) to heat sink elements 140, heat sink assembly 100 may achieve a higher degree of smoothness, thereby improving heat transfer from crystal rod 120 to heat sink elements 140 (e.g., by increasing an amount of contact points between respective surfaces for heat transfer), and may achieve a higher level of durability for heat sink elements 140, relative to a non-plated heat sink element. Additionally, by adding gold-plating (e.g., to a copper alloy material), implementations described herein improve adhesion and/or solderability to thermal interface material 160 (e.g., a copper to indium adhesion or solderability).

In this way, heat sink assembly 100 enables thermal management of crystal rod 120 and maintains low depolarization by ensuring proper alignment of the crystalline orientation, thereby enabling maintenance of a precise laser wavelength, improved output efficiency, maintenance of a desired beam quality, and reduced thermal stress relative to another type of heat sink assembly.

As indicated above, FIGS. 1A-1D are provided as an example. Other examples may differ from what is described with regard to FIGS. 1A-1D.

Figure 2A:
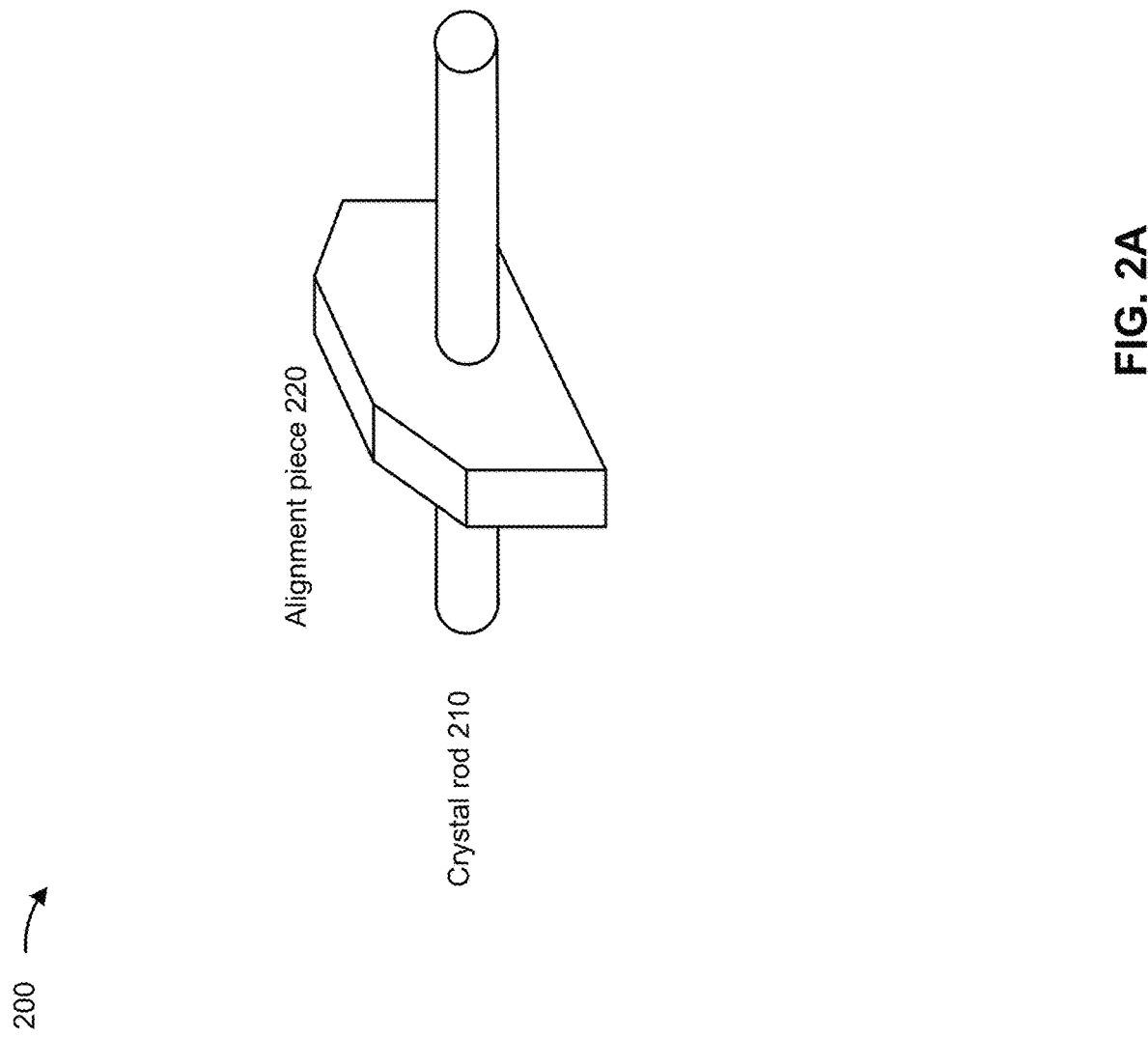
FIGS. 2A-2B are diagrams of an example heat sink element, alignment body, and crystal rod described herein.
Figure 2B:
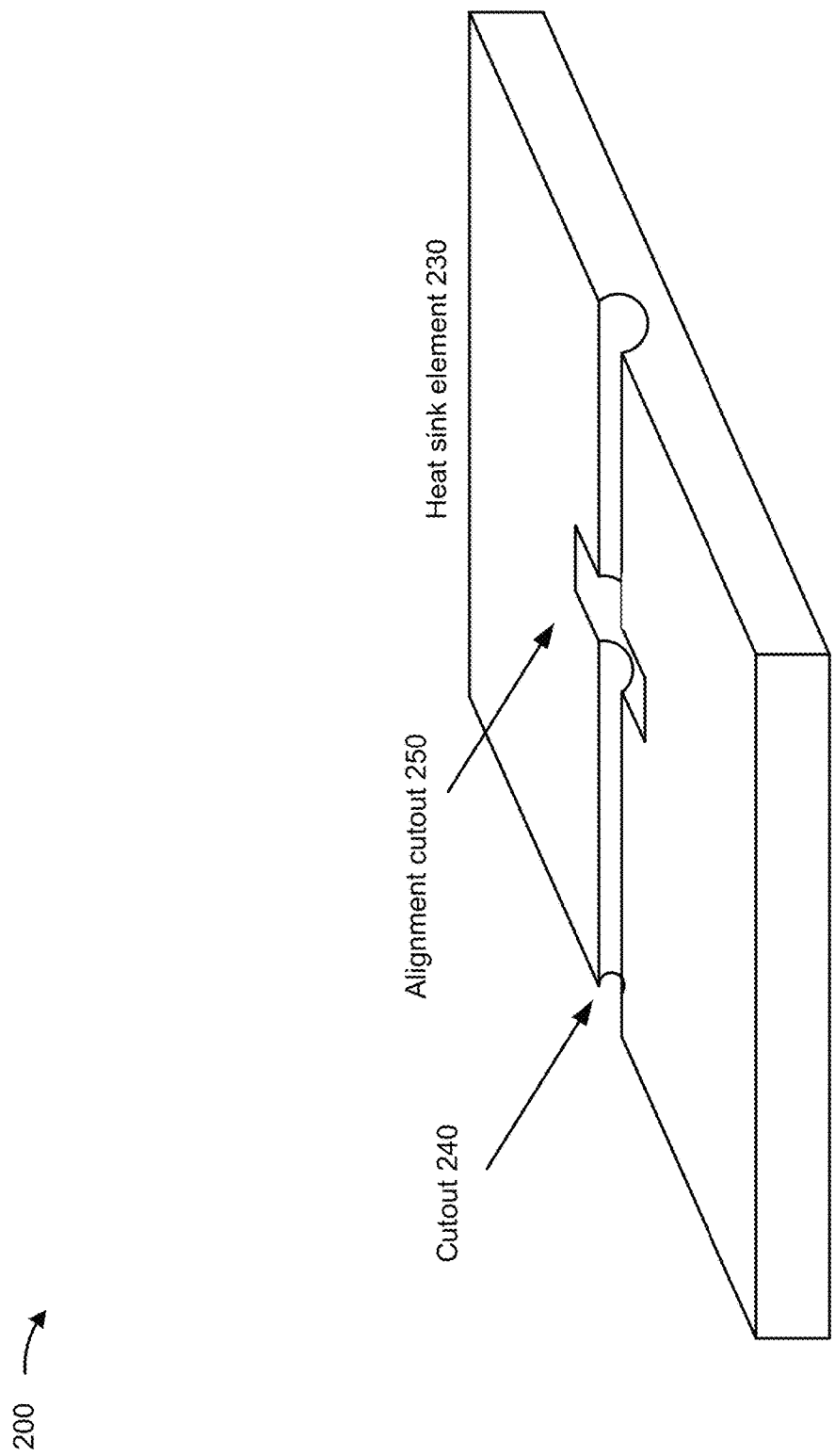

FIGS. 2A and 2B are diagrams of an example implementation 200 of a heat sink element, an alignment body, and a crystal rod. As shown in FIG. 2A, a crystal rod 210 (e.g., which may correspond to crystal rod 120) may be disposed in an opening of an alignment body 220 (e.g., which may correspond to alignment body 150). For example, alignment body 220 may include a circular opening (or another type of opening, such as an oval opening, an elliptical opening, a near-circular opening, among other examples) that receives crystal rod 210. In this case, a surface of the circular opening is adhered to a surface of crystal rod 210 to maintain a crystalline orientation of crystal rod 210 relative to a physical orientation of alignment body 220. In other words, crystal rod 210 is prevented from rotating within the opening of alignment body 220. In this way, setting an alignment of crystal rod 210 to alignment body 220 enables use of alignment body 220 to align crystal rod 210 to a heat sink assembly indirectly. In this case, alignment body 220 is alignable to a heat sink assembly with a higher degree of accuracy than crystal rod 210. Further, crystal rod 210 is alignable to alignment body 220 with a higher degree of accuracy than to a heat sink assembly, as described in more detail herein. This results in a higher degree of accuracy by aligning crystal rod 210 indirectly via alignment body 220 rather than directly as occurs without an alignment body 220. For example, alignment body 220 may enable achievement of a rotational alignment (e.g., of the crystalline orientation of crystal rod 210 to the physical orientation of alignment body 220) of within ±4 degrees of rotation (e.g., which for a 1 mm diameter crystal rod 210 is a linear rotation of less than ±0.035 mm). In some implementations, alignment body 220 may enable alignment with a precision of ±1.5 degrees of rotation. Achieving these levels of alignment ensures sufficient suppression of depolarization losses to enable usage in ultrafast lasers or high performance optical systems, among other examples.

As shown in FIG. 2B, example implementation 200 includes a heat sink element 230 (e.g., which may correspond to heat sink element 140). Heat sink element 230 may include a first face or surface with a cutout 240. The cutout 240 may be configured to receive crystal rod 210 (or another type of optical component) and alignment body 220 for crystal rod 210. For example, the cutout 240 may have, in part, a semi-circular cutout cross-section and/or a cylindrical cutout shape to receive a cylindrical crystal rod 210.

Further, the cutout 240 may include an alignment cutout 250 to receive alignment body 220. Alignment cutout 250 may be shaped to match alignment body 220, such that alignment body 220 can only fit in alignment cutout 250 with a single orientation relative to a crystalline orientation of crystal rod 210. In other words, a bottom alignment cutout 250 of a bottom heat sink element 230 and a top alignment cutout 250 of a top heat sink element 230 are non-symmetric along a rotational axis (e.g., of crystal rod 210), such that a top of alignment body 220 can fit in top alignment cutout 250 and a bottom of alignment body 220 can fit in bottom alignment cutout 250, but not vice versa.

In some implementations, for another type of optical component or alignment body 220, the cutout 240 and/or the alignment cutout 250 may have another type of shape. In some implementations, heat sink element 230 may have multiple cutouts 240. For example, when a heat sink assembly is to provide cooling for multiple optical components, such as multiple crystal rods or laser mediums, a heat sink element 230 of the heat sink assembly may include multiple cutouts 240 and multiple alignment cutouts 250 to receive the multiple optical components and associated alignment bodies 220. In some implementations, heat sink element 230 may include one or more structural openings (not shown). For example, heat sink element 230 may include one or more openings (not shown) for receiving a structural element, such as a fastener to attach heat sink element 230 to another element of a heat sink assembly (e.g., to a cooling block of a cooling stack).

As indicated above, FIGS. 2A and 2B are provided as an example. Other examples may differ from what is described with regard to FIGS. 2A and 2B.

Figure 3:
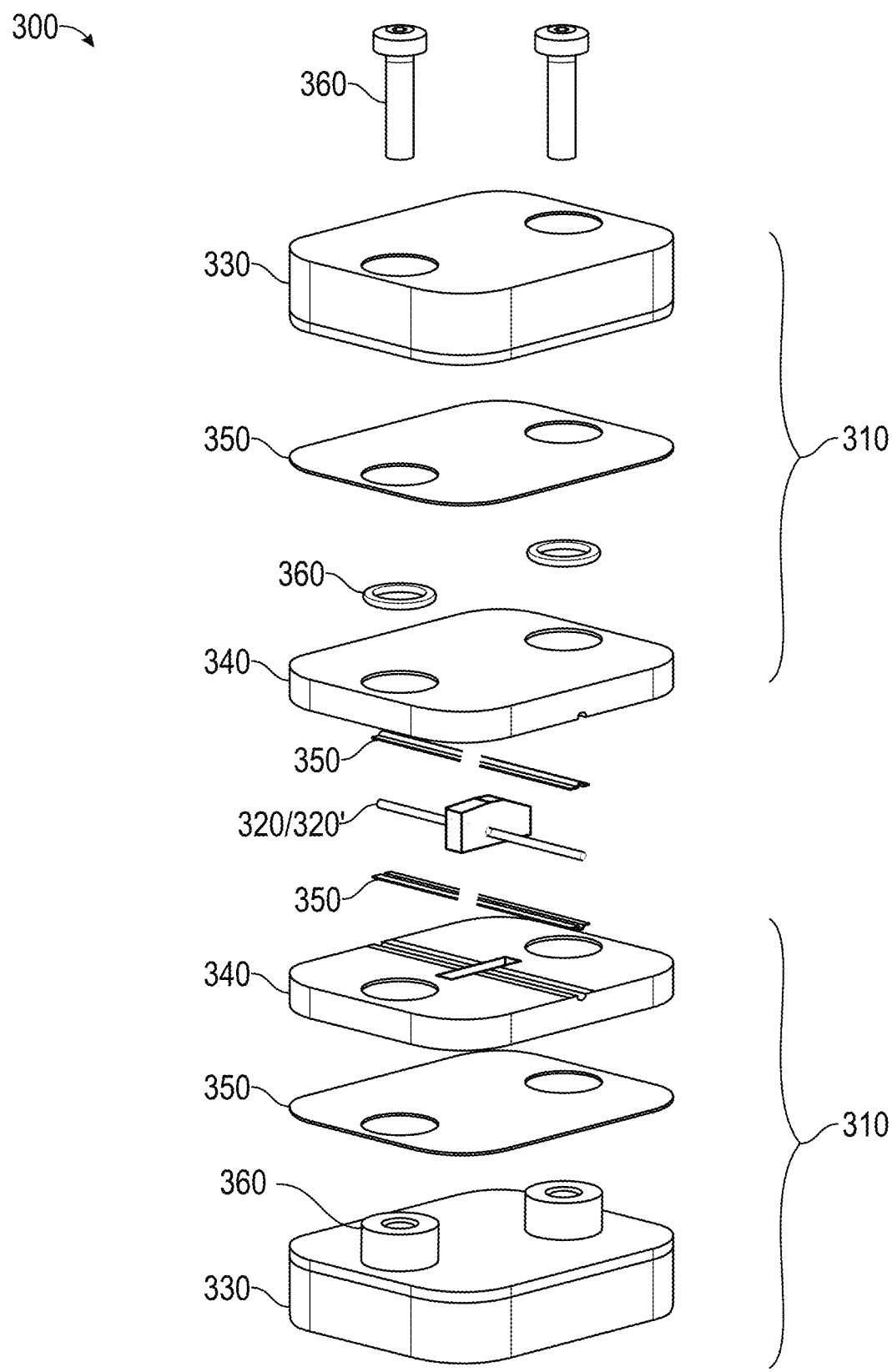
FIG. 3 is a diagram of an example heat sink assembly described herein.

FIG. 3 is a diagram of an example implementation of a heat sink assembly 300. As shown in FIG. 3, heat sink assembly 300 includes a set of cooling stacks 310 (e.g., which may correspond to cooling stacks 110), a crystal rod 320 (e.g., which may correspond to crystal rod 120), and an alignment body 320' (e.g., which may correspond to alignment body 150). A cooling stack 310 includes a cooling block 330 (e.g., which may correspond to cooling block 130), a heat sink element 340 (e.g., which may correspond to heat sink element 140), thermal interface materials 350 (e.g., which may correspond to thermal interface materials 160), and attachment elements 360. In some implementations, attachment elements 360 may include a set of screws, a set of bolts, a set of sockets, a set of O-rings, among other examples.

As indicated above, FIG. 3 is provided as an example. Other examples may differ from what is described with regard to FIG. 3.

Figure 4:
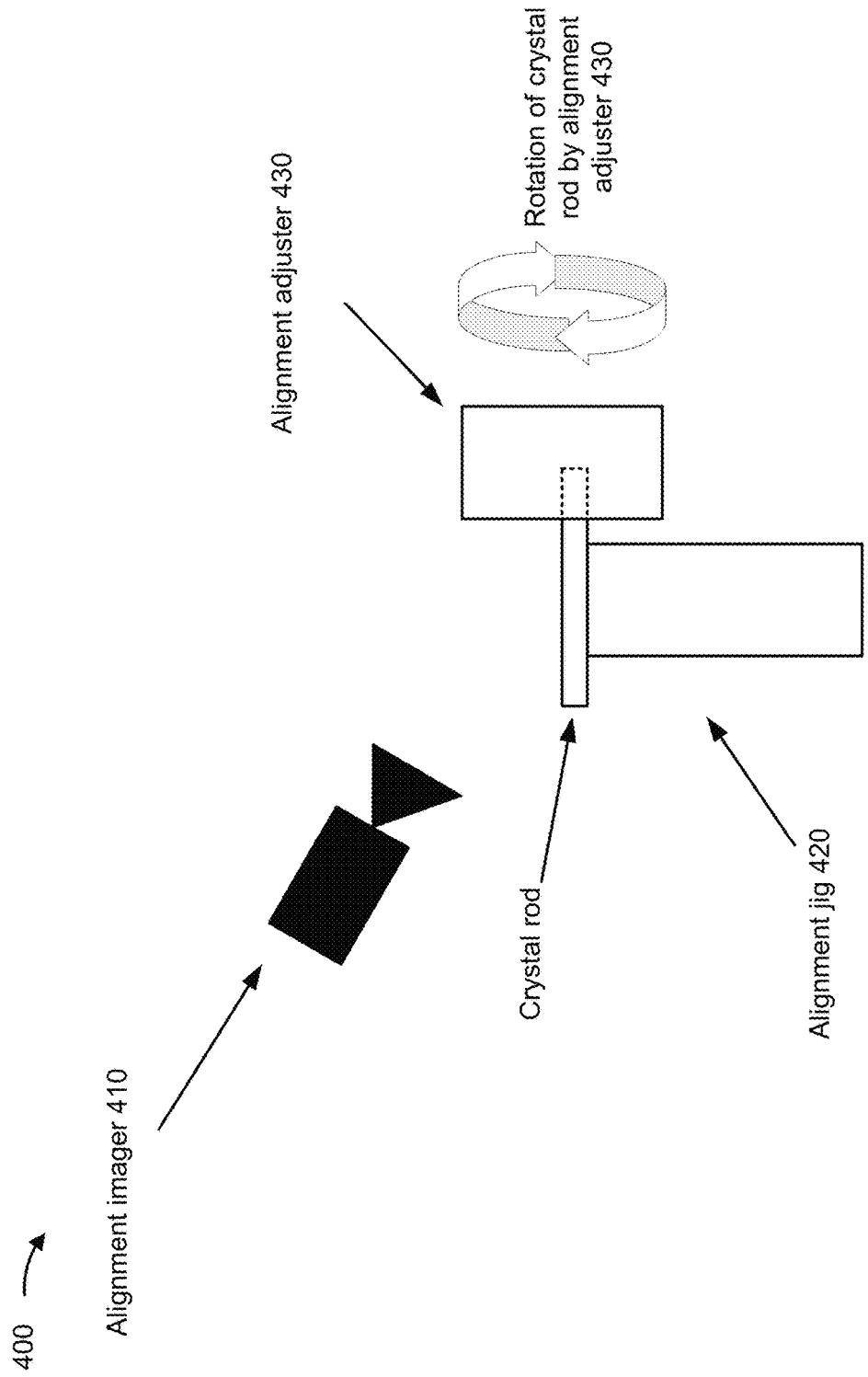
FIG. 4 is a diagram of an example alignment system described herein.

FIG. 4 is a diagram of an example implementation of an alignment system 400. As shown in FIG. 4, alignment system 400 includes an alignment imager 410, an alignment jig 420, and an alignment adjuster 430. In some implementations, alignment imager 410 may include an imaging system to identify a diffraction pattern of a crystal rod being supported by alignment jig 420. For example, as described in more detail herein, alignment imager 410 may x-ray a crystal rod to identify a diffraction pattern while alignment adjuster 430 rotates the crystal rod within alignment jig 420 (e.g., which may include a mirror for identifying the diffraction patterns of x-rays traveling through the crystal rod). When a crystalline orientation of the crystal rod is identified from the diffraction pattern, an alignment body is attached to the crystal rod. In some implementations, the alignment body is attached using a glue material. For example, the glue material may be applied without curing to enable the crystal rod to be rotated and, when the crystalline orientation is identified, the glue may be cured (e.g., using thermal curing, chemical curing, ultraviolet light based curing, or another technique) to statically fix the crystalline orientation by preventing further rotation. Based at least in part on the alignment body being smaller than the heat sink assembly and the cooling stacks thereof, the alignment body is attachable to the crystal rod within alignment jig 420 (e.g., without altering the crystalline orientation, whereas the heat sink assembly may not be attachable without altering the crystalline orientation).

In this way, the alignment body enables statically marking the crystalline orientation under x-ray imaging, to enable indirect alignment of the crystal rod with the heat sink assembly using the alignment body. Different types of alignment systems may be used to identify the crystalline orientation and adhere the alignment body to the crystal rod. After the alignment body is attached to the crystal rod, the alignment body and the crystal rod are mechanically aligned to a heat sink assembly and the heat sink assembly is adhered together, thereby statically fixing the crystalline orientation relative to the heat sink assembly.

As indicated above, FIG. 4 is provided as an example. Other examples may differ from what is described with regard to FIG. 4.

Figure 5:
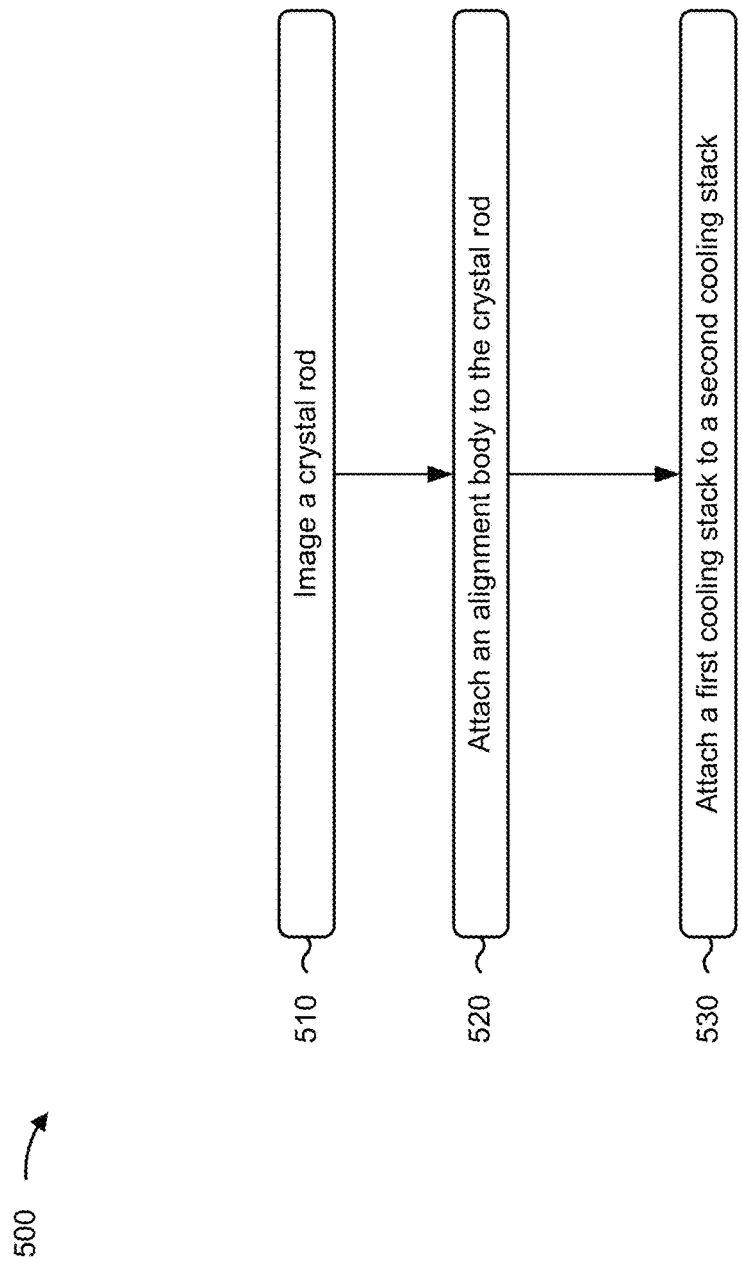
FIG. 5 is a flowchart of an example process relating to aligning a crystalline orientation of a crystal rod with a physical orientation of a heat sink assembly described herein.

FIG. 5 is a flowchart of an example process 500 associated with aligning a crystalline orientation of a crystal rod with a physical orientation of a heat sink assembly. In some implementations, one or more process blocks of FIG. 5 are performed by a device (e.g., an attachment, assembly, alignment, or other manufacturing device, such as devices of the alignment system 400).

As shown in FIG. 5, process 500 may include imaging a crystal rod (block 510). For example, the device may image a crystal rod to determine a crystalline orientation of the crystal rod, as described above.

As further shown in FIG. 5, process 500 may include attaching an alignment body to the crystal rod (block 520). For example, the device may attach an alignment body to the crystal rod, as described above. In some implementations, a physical orientation of the alignment body is fixed relative to the crystalline orientation of the crystal rod. For example, based on determining the crystalline orientation of the crystal rod, the alignment body may be adhered to the crystal rod. In this case, the alignment body (and/or one or more indicia thereon) may provide indicia of the crystalline orientation, thereby allowing alignment of the crystalline orientation with a heat sink assembly and an optical system that includes the heat sink assembly.

As further shown in FIG. 5, process 500 may include attaching a first cooling stack to a second cooling stack (block 530). For example, the device may attach a first cooling stack to a second cooling stack, such that the crystal rod and the alignment body are sandwiched between the first cooling stack and the second cooling stack and the crystalline orientation of the crystal rod is fixed in alignment with the first cooling stack and the second cooling stack, as described above.

Process 500 may include additional implementations, such as any single implementation or any combination of implementations described below and/or in connection with one or more other processes described elsewhere herein.

In a first implementation, imaging the crystal rod comprises x-raying the crystal rod and identifying a diffraction pattern based on x-raying the crystal rod, wherein the diffraction pattern is associated with the crystalline orientation of the crystal rod.

In a second implementation, alone or in combination with the first implementation, process 500 includes inserting the crystal rod into an opening of the alignment body, and imaging the crystal rod comprises rotating the crystal rod within the opening of the alignment body, during the imaging of the crystal rod, until the crystalline orientation of the crystal rod is in alignment with the physical orientation of the alignment body.

In a third implementation, alone or in combination with one or more of the first and second implementations, attaching the alignment body to the crystal rod comprises adhering a surface of the crystal rod to a surface of an opening of the alignment body.

In a fourth implementation, alone or in combination with one or more of the first through third implementations, process 500 includes inserting the alignment body and the crystal rod into a first cutout in a first surface of the first cooling stack, wherein a first shape of the alignment body and a second shape of the first cutout are configured such that the alignment body and the crystal rod fit into the first cutout in a single rotational orientation, and wherein attaching the first cooling stack to the second cooling stack comprises mating the first cooling stack to the second cooling stack, such that the alignment body and the crystal rod are inserted into a second cutout in a second surface of the second cooling stack, and adhering the first cooling stack and the second cooling stack, such that the alignment body and the crystal rod are statically constrained within the first cutout and the second cutout.

In a fifth implementation, alone or in combination with one or more of the first through fourth implementations, process 500 includes disposing a thermal interface material between the crystal rod and respective faces of the first cooling stack and the second cooling stack.

Although FIG. 5 shows example blocks of process 500, in some implementations, process 500 includes additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations may not be combined.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). Further, spatially relative terms, such as "below," "lower," "above," "upper," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:

1. A heat sink assembly, comprising:
    an alignment body, for aligning a crystalline orientation of a crystal rod with a physical orientation of the heat sink assembly, with an opening configured to receive a crystal rod,
        wherein the opening is configured to maintain a crystalline orientation of the crystal rod relative to an orientation of the alignment body;
    a first cooling stack,
        wherein the first cooling stack includes a first cutout to receive the crystal rod and the alignment body; and
    a second cooling stack,
        wherein the second cooling stack includes a second cutout to receive the crystal rod and the alignment body, and
        wherein the first cooling stack and the second cooling stack are configured to mate and at least partially cover above and below the crystal rod and the alignment body.

2. The heat sink assembly of claim 1, wherein the crystal rod is an ytterbium-doped, yttrium-aluminum-garnet laser medium.

3. The heat sink assembly of claim 1, wherein the first cooling stack includes a first heat sink element and a first cooling block attached to a first side of the first heat sink element, and the second cooling stack includes a second heat sink element and a second cooling block attached to a first side of the second heat sink element.

4. The heat sink assembly of claim 3, wherein the first heat sink element includes the first cutout, in a second side of the first heat sink element, to receive the crystal rod and the alignment body, and the second heat sink element includes the second cutout, in a second side of the second heat sink element, to receive the crystal rod and the alignment body.

5. The heat sink assembly of claim 1, wherein the first cooling stack and the second cooling stack include respective coolant channels for receiving a liquid coolant.

6. The heat sink assembly of claim 1, wherein the alignment body includes an ytterbium material.

7. A heat sink assembly, comprising:
    a first cooling stack including a first heat sink element;
    a second cooling stack including a second heat sink element;
    an optical component; and
    an alignment body, for aligning a crystalline orientation of a crystal rod with a physical orientation of the heat sink assembly, attached to the optical component, wherein the first heat sink element and the second heat sink element include respective cutouts to receive the alignment body and the optical component.

8. The heat sink assembly of claim 7, wherein the respective cutouts are non-symmetric along a rotational axis of the optical component, such that the alignment body and the optical component fit in the respective cutouts in a single orientation along the rotational axis of the optical component.

9. The heat sink assembly of claim 7, wherein the optical component includes:
    a crystal rod disposed in the respective cutouts.

10. The heat sink assembly of claim 7, wherein the optical component is to be attached to the first heat sink element and the second heat sink element using a solder material or a thermal interface material.

11. The heat sink assembly of claim 10, wherein the optical component is attached to the first heat sink element and the second heat sink element using the thermal interface material, and the thermal interface material is a tin material or a graphite material.

12. The heat sink assembly of claim 7, wherein an optical component coefficient of thermal expansion (CTE) of the optical component is within 25% of a heat sink element CTE of the first heat sink element and the second heat sink element.

13. The heat sink assembly of claim 7, wherein an optical component coefficient of thermal expansion (CTE) of the optical component is within 25% of an alignment body CTE of the alignment body.

14. The heat sink assembly of claim 7, wherein the first cooling stack further comprises a first cooling block attached to the first heat sink element, and wherein the second cooling stack further comprises a second cooling block attached to the second heat sink element.

15. A method, comprising:
  imaging a crystal rod to determine a crystalline orientation of the crystal rod;
  attaching an alignment body, for aligning a crystalline orientation of the crystal rod with a physical orientation of a heat sink assembly, to the crystal rod, wherein an orientation of the alignment body is fixed relative to the crystalline orientation of the crystal rod; and
  attaching a first cooling stack to a second cooling stack, such that the crystal rod and the alignment body are configured to be located between the first cooling stack and the second cooling stack and the crystalline orientation of the crystal rod is fixed in alignment with the first cooling stack and the second cooling stack.

16. The method of claim 15, wherein imaging the crystal rod comprises:
  x-raying the crystal rod; and
  identifying a diffraction pattern based on x-raying the crystal rod, wherein the diffraction pattern is associated with the crystalline orientation of the crystal rod.

17. The method of claim 15, further comprising:
  inserting the crystal rod into an opening of the alignment body; and
  wherein imaging the crystal rod comprises:
    rotating the crystal rod within the opening of the alignment body, during the imaging of the crystal rod, until the crystalline orientation of the crystal rod is in alignment with the physical orientation of the alignment body.

18. The method of claim 15, wherein attaching the alignment body to the crystal rod comprises:
  adhering a surface of the crystal rod to a surface of an opening of the alignment body.

19. The method of claim 15, further comprising:
  inserting the alignment body and the crystal rod into a first cutout in a first surface of the first cooling stack, wherein a first shape of the alignment body and a second shape of the first cutout are configured such that the alignment body and the crystal rod fit into the first cutout; and
  wherein attaching the first cooling stack to the second cooling stack comprises:
    mating the first cooling stack to the second cooling stack, such that the alignment body and the crystal rod are inserted into a second cutout in a second surface of the second cooling stack; and
    adhering the first cooling stack and the second cooling stack, such that the alignment body and the crystal rod are statically constrained within the first cutout and the second cutout.

20. The method of claim 15, further comprising:
  disposing a thermal interface material between the crystal rod and a first face of the first cooling stack and a second face of the second cooling stack.

\* \* \* \* \*